Jan. 22, 1957     A. ROESCH     2,778,227
GYROSCOPES

Filed July 6, 1953     2 Sheets-Sheet 1

INVENTOR:
ADOLF ROESCH
BY:

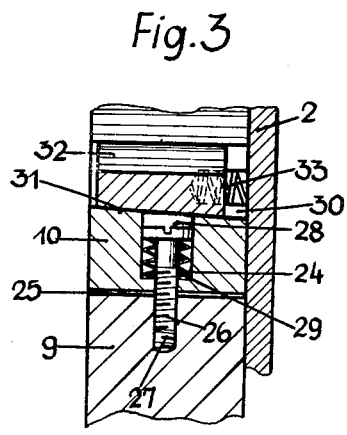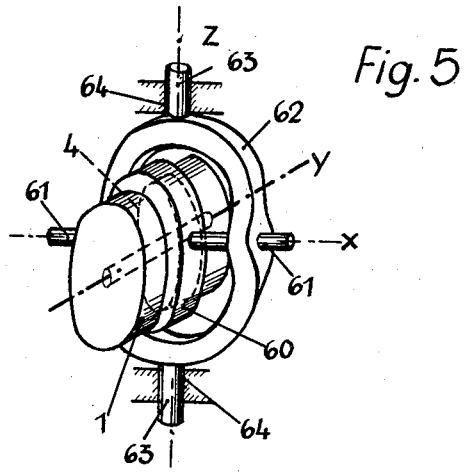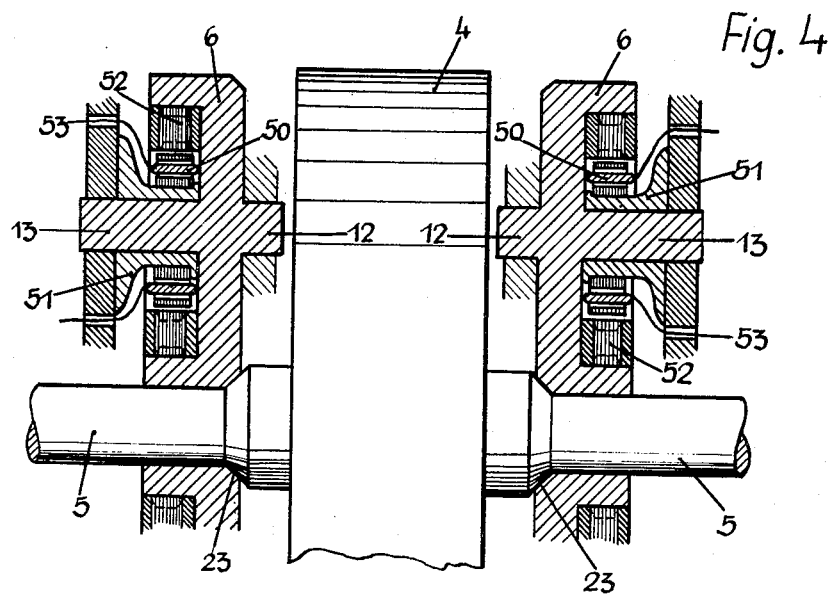

United States Patent Office 2,778,227
Patented Jan. 22, 1957

2,778,227
GYROSCOPES
Adolf Roesch, Pforzheim, Germany
Application July 6, 1953, Serial No. 366,270
Claims priority, application Germany October 29, 1952
19 Claims. (Cl. 74—5.7)

The present invention relates to gyroscopes.

As is well known, the effectiveness of a gyroscope is dependent on the speed of rotation thereof. The speed of known gyroscopes is limited on the one hand by the critical speed determined by the construction of the gyroscopes themselves and beyond which the gyroscopes cannot be safely operated and on the other hand by the bulk of the drive means which rotates the gyroscopes, this bulk also providing limits on the speed of operation of the gyroscopes. Thus, with known gyroscopes it is seldom possible to obtain a speed of over 50,000 R. P. M., this latter speed being that at which bearings, with the best possible lubrication, can rotate.

One of the objects of the present invention is to provide a gyroscope which has an extremely high critical speed.

A further object of the present invention is to provide a gyroscope in which all parts of the gyroscope except its rotor turn at a speed far below that of the gyroscope rotor.

An additional object of the present invention is to provide a drive means which requires an extremely small amount of space and is built into parts of the gyroscope.

Another object of the present invention is to provide a gyroscope which is capable of automatically compensating for wear in the parts of the gyroscope.

A still further object of the present invention is to provide a gyroscope whose parts are free to move during expansion and contraction resulting from changes in temperature.

Still another object of the present invention is to provide a gyroscope whose parts are capable of being cooled and lubricated by the operation of the gyroscope itself.

Yet another object of the present invention is to provide a gyroscope capable of rotating at speeds several times greater than the maximum speeds of known gyroscopes.

A still additional object of the present invention is to provide a gyroscope which is composed of simple and ruggedly constructed parts capable of giving reliable service for a long period of time.

With the above objects in view, the present invention mainly consists of a gyroscope which includes a disc-shaped gyroscope rotor having a pair of integral shaft portions extending respectively from opposite sides thereof along the axis thereof. Two pairs of rollers having axes parallel to the rotor axis are located on one side of the rotor axis respectively in engagement with these rotor shaft portions, each pair of rollers being axially displaced with respect to each and overlapping each other to form, in a plane normal to the rotor axis on which the peripheries of the pair of rollers are projected, a substantially V-shaped cradle for the shaft portion engaging this pair of rollers. A pair of additional rollers having axes parallel to the rotor axis are located on the opposite side of the rotor axis from the above-mentioned two pairs of rollers respectively in engagement with the rotor shaft portions and respectively opposite these two pairs of rollers. A support means supports all of the rollers for rotating about their axes, and a spring means is operatively connected to the additional pair of rollers to urge them respectively against the shaft portions so as to urge these shaft portions into the substantially V-shaped cradles formed by the first-mentioned two pairs of rollers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1a and 1b are respectively sectional elevational views of two halves of a gyroscope constructed in accordance with the present invention, the right edge of the structure of Fig. 1a forming a continuation of the left edge of the structure of Fig. 1b in the actual gyroscope, and Fig. 1a being taken along line I—I of Fig. 2 in the direction of the arrows while Fig. 1b is taken along line II—II of Fig. 2 in the direction of the arrows;

Fig. 2 is a partly broken away end view of the gyroscope of Figs. 1a and 1b as seen from the left side of Fig. 1a;

Fig. 3 is a fragmentary sectional view taken along line III—III of Fig. 2 in the direction of the arrows;

Fig. 4 is a fragmentary, elevational, partly diagrammatic view of a different embodiment of a gyroscope constructed in accordance with the present invention; and Fig. 5 is a diagrammatic perspective view of the support for the gyroscope of the invention.

Figure 1A:
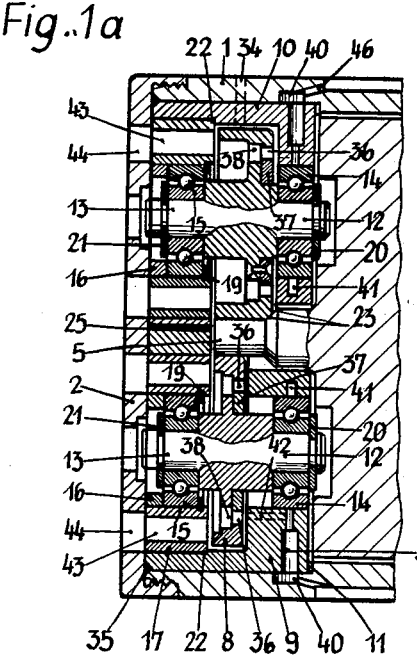
Figure 1B:
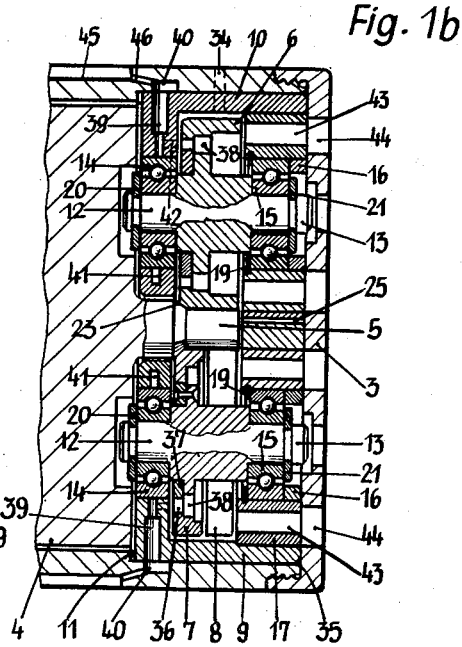
Figure 2:
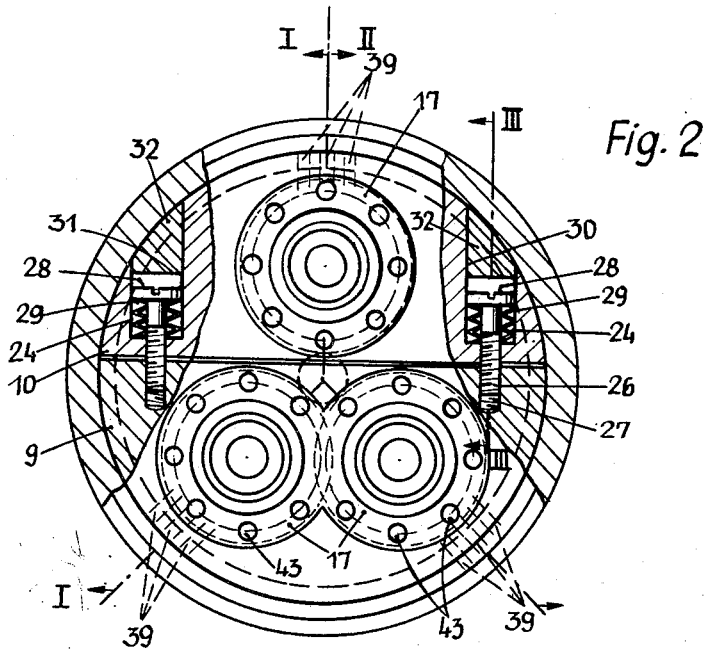

Referring now to the drawings, and to Figs. 1a and 1b in particular, it will be seen that the gyroscope of the invention includes three rollers 6, 7 and 8 located on each side of the gyroscope rotor 4, part of which is shown at the right side of Fig. 1a and part of which is shown at the left side of Fig. 1b. These three rollers on each side of the gyroscope rotor 4 are supported by housings 9 and 10 which are substantially semi-cylindrical, as shown in Fig. 2.

The two lower rollers 7 and 8, located on each side of the rotor 4, are supported by housing 9, while each of the upper rollers 6 is supported by a housing 10. The distance between the axes of each pair of rollers 7 and 8 located on the same side of the rotor 4 is smaller than the diameters of these rollers 7 and 8, each pair of rollers 7 and 8 being axially displaced with respect to each other and partly overlapping each other so that the peripheries of each pair of rollers 7 and 8 form a substantially V-shaped cradle for a rotor shaft portion 5, when these peripheries are projected onto a plane normal to the rotor axis, as is evident from Fig. 2.

The pair of rollers 6 are located on the opposite side of the rotor axis from the rollers 7 and 8 and are respectively located opposite the two pairs of rollers 7 and 8. Therefore, while the rollers 7 and 8, because of their overlapping relationship, can only extend along a part of the length of the rotor shaft portions 5, the rollers 6, because they are not in overlapping relationship with any other rollers, can and do extend respectively along the entire lengths of the shaft portions 5 of the gyroscope rotor 4. The axes of all of the rollers 6—8 are parallel to the rotor axis, and the rollers 6 are approximately twice as thick as the rollers 7 and 8.

Each pair of rollers 7 and 8 are positioned with respect to each other in such a way that straight lines drawn in a plane normal to the rotor axis through this axis and the axes of rollers 7 and 8 make an angle of approximately 84° with respect to each other, this angle being bisected by a straight line drawn in this plane through the gyroscope rotor axis and the axis of rollers 6. This arrangement has proved to be particularly suitable for the transmission of rotation from the rollers to the shaft portions 5 of the rotor 4.

Each of the rollers 6—8 is provided with integral shaft portions 12 and 13 extending from opposite sides thereof and along the axis thereof, these shaft portions 12 and 13 being shown in the drawings to be turnably carried by ball bearings 14 and 15, respectively, although roller bearings could also be used, if desired. The shaft portions 12 of the rollers and the bearings 14 turnably carrying the same are located nearest to the rotor 4, and each of the bearings 14 is mounted for free sliding movement in a bore formed in each housing 10, in the case of roller 6, and in the housing 9 in the case of rollers 7 and 8. The bearings 14 and 15 are substantially smaller in diameter than the rollers so that the bearings of rollers 7 and 8 do not overlap each other.

The housings 9 and 10 are formed, about the bearings 15, with circular openings which are substantially larger than these bearings 15, and ring members 17 are respectively located in these latter openings of the housings 9 and 10 respectively in slidable engagement with the outer race rings of bearings 15. The rings 17 each have an outer diameter which is at least as great as the outer diameter of the rollers, and each bearing 15 in the ring 17 engages, at the inner side of its outer race ring, a snap ring 19 located in an annular groove of each ring 17 and, at the outer side of its outer race ring, an annular ring member 16. The pair of rings 16 and 19 located on opposite sides of each bearing 15 prevent axial shifting of each bearing 15 with respect to the ring 17 in which it is located, and the outer sides of the inner race rings of each pair of bearings 14 and 15 are respectively located against snap rings 20 and 21 located respectively in annular grooves of shaft portions 12 and 13 so that the bearings 14 and 15 of each roller cannot move axially with respect to each other. Thus, axial expansion and contraction of the rollers and their bearings necessarily results only in sliding movement of the outer race rings of bearings 14 with respect to the housings in which these bearings are mounted.

On one end of the gyroscope, the left end thereof as viewed in Figs. 1a and 1b and shown in Fig. 1a, the rings 17 and openings in which they are located are of a larger size than the corresponding rings and openings located at the opposite end of the gyroscope, and these slightly larger rings 17 shown in Fig. 1a engage shoulders 22 formed in the housings 9 and 10 of Fig. 1a so that when the end cover 2 of the gyroscope is connected to the cylindrical casing 1 thereof, as by threading, as shown in Fig. 1a, the rings 17 engaging this end cover 2 will be prevented from moving axially. No axial fixing of the rings 17 is provided at the opposite end of the gyroscope. Thus, it is possible at this opposite end of the gyroscope, shown in Fig. 1b, to axially adjust the positions of the rollers 6—8 shown in Fig. 1b by replacing the rings 16 with rings of a different length in the axial direction, these rings 16 being located between the bearings 15 and the inner face of cover 3 threadedly connected to the end of cylindrical casing 1 shown in Fig. 1b in the same way that end cover 2 is joined thereto. Thus, by properly choosing the axial length of the rings 16 at the end of the gyroscope shown in Fig. 1b, it is possible to eliminate any axial play in the gyroscope. In order to prevent axial movement of the gyroscope rotor 4, this rotor is joined to its shaft portions 5 through the medium of conical shoulders 23 which engage the peripheries of the rollers 6 and 7. These conical shoulders 23 provide a strong connection between the rotor 4 and its shaft portions 5 since there is no tendency for any cracks to be produced, as would be the case, for example, if sharp right-angled corners were provided at these parts of the structure, and the stiffness of the gyroscope rotor is increased in this way so as to aid in the achievement of a high critical speed.

The semi-cylindrical bearing housings 9 and 10 substantially fill the hollow space in the cylindrical casing 1 on opposite sides of the rotor 4. The housings 9 which support the rollers 7 and 8 are slightly greater than one half of a cylinder in cross section. Each housing 10 is formed on opposite sides of the roller 6 turnably supported therein with a pair of bores 24 which are stepped as shown in Fig. 2 and which extend toward the housing 9, these bores 24 being perpendicular to and communicating with a slight gap 25 located between each pair of housings 9 and 10 on the same side of the rotor 4.

Screw members 26 respectively extend through the bores 24 across the gap 25 into threaded engagement with threaded openings 27 formed in the housings 9. The enlarged portion of each bore 24, located distant from the gap 25, as shown in Fig. 2, is sufficiently large in cross section to freely receive the head 28 of the screw member 26 as well as a spring 29 located between the head 28 and the shoulder of bore 24 located between the bore portions of large and small diameter. Each spring 29 engages the screw head 28 located thereover to urge the screw 26 having this screw head away from the housing 9 so that the housings 9 on opposite sides of the rotor 4 are respectively urged toward the housings 10 to tend to close the gap 25, and in the construction shown in Figs. 2 and 3 each spring 29 is formed by a stack of dish-shaped annular springy members located about the screw 26 and being alternately directed in opposite directions, as shown.

This urging of the housings 9 and 10 on each side of rotor 4 toward each other by the springs 29 causes the rollers 6—8 to be pressed against the shaft portions 5, and the engagement between these shaft portions and rollers prevents the housings 9 and 10 on each side of the rotor 4 from moving into engagement with each other to close the gap 25. This gap 25 forms an air space which locates the housings 9 and 10 on each side of rotor 4 from each other by a distance on the order of a few hundredths of a millimeter. Thus, the driving engagement between the rollers 6—8 and the rotor shaft portions 5 is constantly maintained in this way because the springs 29 automatically compensate for any wear between these rollers and rotor shaft portions so that the drive to the gyroscope rotor is assured. In order that the springs 29 may freely operate to urge the roller 6—8 against the rotor shaft portions 5, the housings 9 and 10 are not fixed to the casing 1. They slidably engage the inner face of the casing 1 and are located between the shoulders 11 of the casing and the covers 2 and 3, respectively, so that they cannot shift axially.

Each of the bearing housings 10 is formed over the bores 24 thereof with a pair of axially extending notches 30, these notches 30 each having a bottom face 31 which is inclined and approaches the casing 1 from the end of the notch adjacent cover 2 or 3 to the opposite end of the notch, as shown in Fig. 3. Each of these notches 30 has a wedge member 32 located therein which is provided with an outer curved surface portion corresponding to the curvature of the inner face of the gyroscope casing 1. Springs 33 engage the covers 2 and 3 and respectively extend into openings in the wedge members 32 and engage the latter to urge these wedge members away from the end covers and along the inclined faces 31 into engagement with the inner surface of casing 1. The springs 33 are weaker than the springs 29 so that movement of each pair of housings 9 and 10 toward each other is controlled by the springs 29, but the springs 33 guarantee that the wedge members 32 will be maintained against the inner surface of casing 1 so as to eliminate play between housings 9 and 10 and casing 1 even if these housings 9 and 10 are drawn toward each other by the springs 29 to take up wear between the rollers 6—8 and rotor shaft portions 5.

Thus, the springs 33 do not control the driving engagement between the rollers 6—8 and the rotor shaft portions 5.

In order to prevent rotation of the housings 9 and 10, pins 34 are fixed to the casing 1 and extend slidably into openings formed in the housings 10, respectively, as is shown in Fig. 1, so that these pins 34 do not prevent movement of housings 10 respectively toward housings 9. A sealing ring 35 is located between the bevelled inner peripheral end edges of casing 1 and the outer bevelled peripheral edges of housings 9 and 10 at each end of the gyroscope, these rings 35 also being located respectively against the inner faces of end covers 2 and 3.

The above-described structure is common to both embodiments of the invention which are illustrated in the drawings. However, the embodiment of Figs. 1–3 is driven differently from the embodiment of Fig. 4. According to the embodiment of the invention shown in Figs. 1–3, the rollers 6—8 are formed as air turbine rotors. The turbine buckets 36 are preferably provided at the peripheries of annular flat rings 37 which are respectively located in annular recesses of the rollers 6—8 at the sides thereof directed toward the gyroscope rotor 4, these rings 37 being fixed to the rollers 6—8, respectively, as by being riveted thereto. Each of the rollers 6—8 is formed with a plurality of openings 38 communicating with the buckets 36 of the ring 37 fixed thereto.

The air under pressure which drives the rollers moves to the same through radially extending bores 39 formed in the housings 9 and 10 and communicating at one end with annular grooves 40 formed in the casing 1, two grooves 40 being provided to communicate with the bores 39 at opposite sides of the rotor 4, respectively. At their inner ends the bores 39 located at each side of rotor 4 communicate with annular grooves 41 formed in the housings 9 and 10 at each side of rotor 4, each of the grooves 41 extending about and communicating with the outer surface of the outer race ring of each bearing 14. Each of the annular grooves 41 communicates with a plurality of bores 42 formed in housings 9 and 10 and terminating opposite the buckets 36 of the members 37, these bores 42 forming nozzles for the air under pressure and extending at an angle to the plane of rings 37, this angle being chosen to cooperate with the buckets 36 to produce the desired speed of rotation of the gyroscope.

The air under pressure which passes through the buckets 36 and openings 38 of the rollers 6—8 escapes through bores 43 formed in the rings 17, which carry the bearings 15, and through the apertures 44 formed in the covers 2 and 3 and being respectively aligned with the bores 43, this air passing to the atmosphere after it leaves the apertures 44. The air under pressure is guided into the gyroscope through the annular groove 45 formed in the outer surface of casing 1 about rotor 4, and this annular groove 45 communicates with bores 46 which in turn communicate with the annular grooves 40 to guide the air under pressure from the groove 45 to the bores 39 and through the rollers to drive the latter and thereby rotate the gyroscope. An annular cover located against and about the casing 1 over the groove 45 thereof carries a pair of pivot pins which are bored to guide air into the annular passage formed by the groove 45 and the cover thereof not shown in Figs. 1a and 1b.

As is evident from Fig. 1, the interior of the gyroscope communicates with the air under pressure only through narrow spaces, and since the air under pressure travels at a high speed, it is impossible for large pressures of air to build up in the interior of the gyroscope so that turbulence effects cannot be produced by the rotor 4 which has a peripheral speed above the speed of sound.

Fig. 4 of the drawings shows a different embodiment of the invention according to which the rollers 6—8, which are supported and which engage the gyroscope rotor in the same way as in the embodiment of Figs. 1–3, are in the form of annular rotors of electric motors. The stator 50 of each of these motors is mounted on a tubular member 51 which is fixed to a part of the bearing housing and through which the shaft portion 13 of each roller extends, each stator being located in a recess of its roller 6, 7, or 8 and each roller carrying at the inner periphery of this recess a short circuited ring 52 forming a rotor which is located about the stator 50. The leads 53 are guided through suitable openings in the bearing housing to the stator winding 50, these openings, for example, being formed in the rings 17 of Figs. 1a and 1b which may carry the tubular supports 51 for the stators 50.

With both of the above-described embodiments of the invention the shaft portions 5 of the rotor 4 are each carried in a V-shaped cradle, as was mentioned above, this cradle being formed by the cylindrical peripheries of each overlapping pair of rollers 7 and 8 which are axially displaced with respect to each other, and on the other side of the rotor axis shaft portions 5 are engaged by the cylindrical peripheries of rollers 6 which resiliently urge the shaft portions into the V-shaped cradles. This support for the rotor has all of the characteristics which provide the best possible gyroscope. The overlapping arrangement of two of the three rollers located on each side of the rotor 4 makes it possible to locate, in the cross sectional housing space determined by the diameter of rotor 4, three rollers of relatively large diameter so that in this way a large transmission ratio between the rollers and shaft portions 5 may be obtained. That is, the diameter of the rollers 6—8 is so much larger than that of the shaft portion 5 that these shaft portions and the rotor 4 therewith rotate at a speed several times greater than the speed of rotation of the rollers 6—8. At the same time, the angle between tangents to each pair of rollers 7 and 8 at the points where these rollers contact each shaft portion 5 is so great that no clamping of the shaft portions is produced by the pressure with which these shaft portions are pressed into the substantially V-shaped cradles by the rollers 6.

Inasmuch as each of the rollers 6—8 is independently supported for rotation and independently driven, it is possible for these rollers to provide an absolutely slip-free transmission of rotation to the gyroscope rotor. The pure rolling contact between the hard polished cylindrical peripheries of the rollers and that of the shaft portions 5 requires a relatively small amount of power to produce the desired rotation and results in a very low amount of heat resulting from friction. The spring action which maintains all rollers constantly pressed against the shaft portions 5 automatically compensates for wear between these rollers and shaft portions and avoids any bearing play, a result which would be impossible to obtain if the rollers were turnably supported in fixed bearings.

Fig. 5 of the drawing schematically shows how the gyroscope of Figs. 1–3 is supported. The casing 1 is covered at its annular groove 45 by the annular channel member 60 which receives air under pressure for driving the gyroscope of Figs. 1–3, this channel member 60 being fixed to opposite horizontally extending pivot pins 61 which are turnably carried by a gimbal ring 62. These pivot pins 61 are axially bored to guide air under pressure into the gyroscope and they receive the air under pressure from any suitable source. The gimbal ring 62 carries the vertical pivot pins 63 which are turnably carried by a stationary frame 64 so that the gimbal ring 62 is turnable about the vertical axis $z$ which is perpendicular to the turning axis $x$ of the pivot pins 61. The axis $y$ is the spinning axis of the gyroscope rotor 4, while the axis $x$ is the precession axis and the axis $z$ is the torque axis of the gyroscope.

The above described gyroscope is capable of rotating at speeds of over 100,000 rotations per minute. Moreover, the one piece construction of the gyroscope rotor provides an extremely high critical speed. For example, it was found that the critical speed of a gyroscope rotor having a diameter of 70 mm. and a thickness of 25 mm. was not reached even when the speed of rotation was 170,000 R. P. M.

With the gyroscope of Figs. 1–3, the air surrounds the rollers and their bearings to produce a very good cooling of the gyroscope, and moreover it is possible to combine a fine oil mist with the air passing through the gyroscope so as to lubricate the bearings thereof.

It will be understood that each of the elements described above, or two or more together, may also find a useful application in other types of gyroscope differing from the types described above.

While the invention has been illustrated and described as embodied in air driven gyroscopes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A gyroscope comprising, in combination, a gyroscope rotor having a pair of opposite shaft portions extending therefrom along the axis thereof; at least three rollers engaging and turnably supporting each of said shaft portions, each roller having a diameter substantially greater than the diameter of each shaft portion of said gyroscope rotor and each roller having its axis parallel to said rotor axis; support means supporting said rollers for rotation about their axes; and a plurality of drive means operatively connected to said rollers, respectively, for independently driving the same to rotate said shaft portions and gyroscope rotor therewith.

2. A gyroscope comprising, in combination, a disc-shaped gyroscope rotor having a pair of integral shaft portions extending respectively from opposite sides thereof along the axis thereof; two pairs of rollers having axes parallel to said rotor axis and being located on one side of said rotor axis respectively in engagement with said shaft portions, each pair of rollers being axially displaced with respect to each and overlapping each other to form, in a plane normal to said rotor axis on which the peripheries of said pair of rollers are projected, a substantially V-shaped cradle for the shaft portion engaging said pair of rollers; a pair of additional rollers having axes parallel to said rotor axis and being located on the opposite side of said rotor axis from said two pairs of rollers respectively in engagement with said shaft portions and respectively opposite said two pairs of rollers; support means supporting all of said rollers for rotation about their axes; and spring means operatively connected to said additional pair of rollers to urge the same respectively against said shaft portions so as to urge said shaft portions into said substantially V-shaped cradles formed by said two pairs of rollers.

3. A gyroscope as defined in claim 2 and wherein said support means comprises a pair of first housings turnably supporting said two pairs of rollers, respectively, a pair of second housings turnably supporting said additional rollers, respectively, and a casing located about and engaging all of said housings, said spring means interconnecting the first and second housings located on each side of said gyroscope rotor so as to urge said housings on each side of said rotor toward each other and thereby urge said additional pair of rolls against said shaft portions; and automatic adjusting means operatively engaging one of each pair of first and second housings for maintaining the same in engagement with the inner face of said casing.

4. A gyroscope as defined in claim 3, each of said rollers having a pair of opposite shaft portions extending along the axis thereof and each of said housings having a pair of bearings respectively supporting each of said roller shaft portions for rotation, said housings being formed at their sides adjacent said rotor with openings in which said bearings supporting one of the shaft portions of said rollers are respectively located and being formed at their sides distant from said rotor with additional openings larger than the other bearings supporting the other of the shaft portions of said rollers, a plurality of rings located in said additional openings, respectively, and supporting said other bearings, respectively, and a plurality of annular members respectively engaging said rings and other bearings, said rings having diameters at least equal to that of said rollers.

5. A gyroscope as defined in claim 2 and wherein said support means comprises a pair of first housings turnably supporting said two pairs of rollers, respectively, a pair of second housings turnably supporting said additional rollers, respectively, and a casing located about and engaging all of said housings, said spring means interconnecting the first and second housings located on each side of said gyroscope rotor so as to urge said housings on each side of said rotor toward each other and thereby urge said additional pair of rollers against said shaft portions, said casing being formed in its inner face with a pair of shoulders respectively engaging said pairs of first and second housings located on opposite sides of said rotor and said casing having a pair of end covers respectively engaging said pairs of first and second housings at the faces thereof distant from said gyroscope rotor; and automatic adjustment means operatively engaging one of each of said pairs of first and second housings for maintaining the same in engagement with the inner face of said casing.

6. A gyroscope as defined in claim 2 and wherein said support means comprises a pair of first housings turnably supporting said two pairs of rollers, respectively, a pair of second housings turnably supporting said additional rollers, respectively, and a casing located about and engaging all of said housings, each of said second housings being formed on opposite sides of the additional roller located therein with a pair of bores extending toward the side of said rotor axis opposite from said second housing, and said spring means including a pair of screw members located in said bores, respectively, and threadedly engaging said first housings, and a spring located in each bore and engaging the screw member therein to urge the latter away from the first housing connected thereto, said first and second housings on each side of said gyroscope rotor being slightly spaced from each other so as to be drawn together by said spring means to compensate for wear between said rollers and rotor shaft portions.

7. A gyroscope as defined in claim 6 and wherein each of said second housings is formed with a pair of elongated notches extending in a direction parallel to said rotor axis and being directed toward the inner face of said casing, each of said notches having a bottom face approaching said inner face of said casing from one end of said notch to the opposite end thereof, a wedge member located in each of said notches in engagement with said bottom face thereof and in engagement with said inner face of said casing, and a spring operatively connected to each of said wedge members to urge the same toward said opposite end of the notch in which it is located so as to maintain said wedge member in engagement with said bottom face of said notch and said inner face of said casing.

8. A gyroscope as defined in claim 2 and wherein said support means comprises a pair of first housings turnably supporting said two pairs of rollers, respectively, a pair of second housings turnably supporting said additional rollers, respectively, and a casing located about and engaging all of said housings, said spring means interconnecting the first and second housings located on each side of said gyroscope rotor so as to urge said housings on each side of said rotor toward each other and thereby urge said additional pair of rollers against said shaft portions, each of said rollers having a pair of opposite shaft portions extending along the axis thereof and each of said housings having a pair of bearings respectively supporting each of said roller shaft portions for rotation, said housings being formed at their sides adjacent said rotor with openings in which said bearings supporting one of the shaft portions of said rollers are respectively located and being formed at their sides distant from said rotor with additional openings larger than the other bearings supporting the other of the shaft portions of said rollers, a plurality of rings located in said additional openings, respectively, and supporting said other bearings, respectively, the first and second housings on one side of said gyroscope rotor being formed with shoulders respectively engaging the inner peripheries of the rings located therein to limit movement of said latter rings toward said rotor.

9. A gyroscope as defined in claim 2 and wherein said support means comprises a pair of first housings turnably supporting said two pairs of rollers, respectively, a pair of second housings turnably supporting said additional rollers, respectively, and a casing located about and engaging all of said housings, said spring means interconnecting the first and second housings located on each side of said gyroscope rotor so as to urge said housings on each side of said rotor toward each other and thereby urge the additional pair of rollers against said shaft portion, each of said rollers being in part in the form of an air turbine rotor and said housings being formed with bores for guiding air through said rollers, said casing being formed with an annular groove communicating with said bores to guide air under pressure thereto.

10. A gyroscope as defined in claim 9 and wherein each of said rollers is formed in one face thereof with a recess in which a turbine rotor is located, said rollers being formed with openings communicating with the peripheries of said turbine rotors.

11. A gyroscope comprising, in combination, a gyroscope rotor having a pair of opposite shaft portions extending therefrom along the axis thereof; at least three rollers engaging and turnably supporting each of said shaft portions, each roller having a diameter substantially greater than the diameter of each shaft portion of said gyroscope rotor and each roller having its axis parallel to said rotor axis; support means supporting said rollers for rotation about their axes; and a plurality of electrical drive means operatively connected to said rollers, respectively, for independently driving the same to rotate said shaft portions and gyroscope rotor therewith.

12. A gyroscope comprising, in combination, a gyroscope rotor having a pair of opposite shaft portions extending therefrom along the axis thereof; at least three rollers engaging and turnably supporting each of said shaft portions, each roller having a diameter substantially greater than the diameter of each shaft portion of said gyroscope rotor and each roller having its axis parallel to said rotor axis; support means supporting said rollers for rotation about their axes; and a plurality of electrical drive means operatively connected to said rollers, respectively, for independently driving the same to rotate said shaft portions and gyroscope rotor therewith, each of said electrical drive means comprising a peripheral portion of each roller having an annular rotor of an electric motor fixed thereto and a stator of an electric motor located within said annular rotor.

13. A gyroscope comprising, in combination, a disc-shaped gyroscope rotor having a pair of integral shaft portions extending respectively from opposite sides thereof along the axis thereof; two pairs of rollers having axes parallel to said rotor axis and being located on one side of said rotor axis respectively in engagement with said shaft portions, each pair of rollers being axially displaced with respect to each and overlapping each other to form, in a plane normal to said rotor axis on which the peripheries of said pair of rollers are projected, a substantially V-shaped cradle for the shaft portion engaging said pair of rollers; a pair of additional rollers having axes parallel to said rotor axis and being located on the opposite side of said rotor axis from said two pairs of rollers respectively in engagement with said shaft portions and respectively opposite said two pairs of rollers; a first pair of substantially semi-cylindrical housings respectively supporting said two pairs of rollers for rotation about their axes, respectively, said first pair of housings being respectively located on opposite sides of said gyroscope rotor; a second pair of substantially semi-cylindrical housings respectively located opposite said first pair of housings and respectively supporting said additional pair of rollers for rotation about their axes; and a cylindrical casing located about and engaging said first and second pairs of housings to support the latter.

14. A gyroscope comprising, in combination, a disc-shaped gyroscope rotor having a pair of integral shaft portions extending respectively from opposite sides thereof along the axis thereof; two pairs of rollers having axes parallel to said rotor axis and being located on one side of said rotor axis respectively in engagement with said shaft portions, each pair of rollers being axially displaced with respect to each and overlapping each other to form, in a plane normal to said rotor on which the peripheries of said pair of rollers are projected, a substantially V-shaped cradle for the shaft portion engaging said pair of rollers; a pair of additional rollers having axes parallel to said rotor axis and being located on the opposite side of said rotor axis from said two pairs of rollers respectively in engagement with said shaft portions and respectively opposite said two pairs of rollers; a first pair of substantially semi-cylindrical housings respectively supporting said two pairs of rollers for rotation about their axes, respectively, said first pair of housings being respectively located on opposite sides of said gyroscope rotor; a second pair of substantially semi-cylindrical housings respectively located opposite said first pair of housings and respectively supporting said additional pair of rollers for rotation about their axes; a cylindrical casing located about and engaging said first and second pairs of housings to support the latter; and a pair of spring means respectively located on opposite sides of said gyroscope rotor and each interconnecting the first and second housings located on the same side of said rotor to urge the first and second housings located on the same side of said rotor toward each other so as to urge each of said two pairs of rollers and the additional rollers respectively located opposite the same toward each other to automatically compensate for wear between said rollers and rotor shaft portions so as to maintain said rollers in substantially non-sliding engagement with said rotor shaft portions.

15. A gyroscope comprising, in combination, a disc-shaped gyroscope rotor having a pair of integral shaft portions extending respectively from opposite sides thereof along the axis thereof; two pairs of rollers having axes parallel to said rotor axis and being located on one side of said rotor axis respectively in engagement with said shaft portions, each pair of rollers being axially displaced with respect to each and overlapping each other to form, in a plane normal to said rotor axis on which the peripheries of said pair of rollers are projected, a substantially V-shaped cradle for the shaft portion engaging said pair of rollers; a pair of additional rollers having axes parallel to said rotor axis and being located on the opposite side of said rotor axis from said two pairs of rollers respectively in engagement with said shaft portions and respectively opposite said two pairs of rollers; a first pair of substantially semi-cylindrical housings respectively supporting said two pairs of rollers for rotation about their axes, respectively, said first pair of housings being respectively located on opposite sides of said gyroscope rotor; a second pair of substantially semi-cylindrical housings respectively located opposite said first pair of housings and respectively supporting said additional pair of rollers for rotation about their axes; a cylindrical casing located about and engaging said first and second pairs of housings to support the latter; a pair of spring means respectively located on opposite sides of said gyroscope rotor and each interconnecting the first and second housings located on the same side of said rotor to urge the first and second housings located on the same side of said rotor toward each other so as to urge each of said two pairs of rollers and the additional rollers respectively located opposite the same toward each other to automatically compensate for wear between said rollers and rotor shaft portions so as to maintain said rollers in substantially non-sliding engagement with said rotor shaft portions; and a plurality of drive means operatively connected to said rollers, respectively, for independently driving the same to rotate said shaft portions and gyroscope rotor therewith.

16. A gyroscope comprising, in combination, a disc-shaped gyroscope rotor having a pair of integral shaft portions extending respectively from opposite sides thereof along the axis thereof; two pairs of rollers having axes parallel to said rotor axis and being located on one side of said rotor axis respectively in engagement with said shaft portions, each pair of rollers being axially displaced with respect to each and overlapping each other to form, in a plane normal to said rotor axis on which the peripheries of said pair of rollers are projected, a substantially V-shaped cradle for the shaft portion engaging said pair of rollers; a pair of additional rollers having axes parallel to said rotor axis and being located on the opposite side of said rotor axis from said two pairs of rollers respectively in engagement with said shaft portions and respectively opposite said two pairs of rollers; a first pair of substantially semi-cylindrical housings respectively supporting said two pairs of rollers for rotation about their axes, respectively, said first pair of housings being respectively located on opposite sides of said gyroscope rotor; a second pair of substantially semi-cylindrical housings respectively located opposite said first pair of housings and respectively supporting said additional pair of rollers for rotation about their axes; a cylindrical casing located about and engaging said first and second pairs of housings to support the latter; a pair of spring means respectively located on opposite sides of said gyroscope rotor and each interconnecting the first and second housings located on the same side of said rotor to urge the first and second housings located on the same side of said rotor toward each other so as to urge each of said two pairs of rollers and the additional rollers respectively located opposite the same toward each other to automatically compensate for wear between said rollers and rotor shaft portions so as to maintain said rollers in substantially non-sliding engagement with said rotor shaft portions; and a plurality of drive means operatively connected to said rollers, respectively, for independently driving the same to rotate said shaft portions and gyroscope rotor therewith, each of said drive means forming a part of the roller to which it is operatively connected.

17. A gyroscope comprising, in combination, a gyroscope rotor in the form of a disc having a pair of shaft portions fixed to and extending respectively from opposite faces of said disc along the axis thereof; a housing substantially coaxial with and surrounding said rotor; at least three rollers distributed about and engaging each of said shaft portions and each of said rollers having a diameter substantially larger than the diameter of the shaft portion engaging said roller; first and second independent bearing means located at each end of said housing, said first bearing means turnably carrying two of said three rollers for rotation about axes parallel to said rotor axis, respectively, and said second bearing means turnably carrying the third of said three rollers for rotation about an axis parallel to said rotor axis, said first and second bearing means being spaced from each other; and spring means interconnecting said first and second bearing means for urging the same toward each other so as to maintain said rollers in engagement with said shaft portions.

18. A gyroscope comprising, in combination, a gyroscope rotor in the form of a disc having a pair of shaft portions fixed to and extending respectively from opposite faces of said disc along the axis thereof; a housing substantially coaxial with and surrounding said rotor; at least three rollers distributed about and engaging each of said shaft portions and each of said rollers having a diameter substantially larger than the diameter of the shaft portion engaging said roller; first and second independent bearing means located at each end of said housing, said first bearing means turnably carrying two of said three rollers for rotation about axes parallel to said rotor axis, respectively, and said second bearing means turnably carrying the third of said three rollers for rotation about an axis parallel to said rotor axis, said first and second bearing means being spaced from each other; spring means interconnecting said first and second bearing means for urging the same toward each other so as to maintain said rollers in engagement with said shaft portions; and drive means operatively connected to at least some of said rollers for independently driving the same to rotate said shaft portions and rotor therewith.

19. A gyroscope comprising, in combination, a gyroscope rotor in the form of a disc having a pair of shaft portions fixed to and extending respectively from opposite faces of said disc along the axis thereof; a housing substantially coaxial with and surrounding said rotor; at least three rollers distributed about and engaging each of said shaft portions and each of said rollers having a diameter substantially larger than the diameter of the shaft portion engaging said roller; first and second independent bearing means located at each end of said housing, said first bearing means turnably carrying two of said three rollers for rotation about axes parallel to said rotor axis, respectively, and said second bearing means turnably carrying the third of said three rollers for rotation about an axis parallel to said rotor axis, said first and second bearing means being spaced from each other; spring means interconnecting said first and second bearing means for urging the same toward each other so as to maintain said rollers in engagement with said shaft portions; turbine wheel means operatively connected to and forming a part of at least some of said rollers; and passage means formed in said housing, bearing means, and rollers for directing a fluid under pressure through said turbine wheel means to drive the rollers to which said turbine wheel means are connected.

References Cited in the file of this patent

UNITED STATES PATENTS

| | | |
|---|---|---|
| 616,396 | Billberg et al. | Dec. 20, 1898 |
| 1,289,170 | Hennessy | Dec. 31, 1918 |
| 1,704,205 | Oakes et al. | Mar. 5, 1929 |
| 1,794,749 | Zelov | Mar. 3, 1931 |